United States Patent [19]
Whitener

[11] Patent Number: 5,088,661
[45] Date of Patent: Feb. 18, 1992

[54] AIRCRAFT

[75] Inventor: Philip C. Whitener, Bainbridge Island, Wash.

[73] Assignee: The Boeing Company, Seattle, Wash.

[21] Appl. No.: 512,086

[22] Filed: Apr. 11, 1990

Related U.S. Application Data

[63] Continuation of Ser. No. 345,085, Apr. 28, 1989, abandoned, which is a continuation of Ser. No. 948,317, Dec. 31, 1986, abandoned.

[51] Int. Cl.$^5$ .............................................. B64C 13/16
[52] U.S. Cl. .................................. 244/76 R; 244/213; 244/215; 244/75 R; 244/100 R
[58] Field of Search .................. 244/13, 50, 55, 75 R, 244/45 R, 45 A, 76 R, 118.1, 119, 100 R, 123, 213, 215

[56] References Cited

U.S. PATENT DOCUMENTS

| | | | |
|---|---|---|---|
| 2,385,845 | 10/1945 | Schairer | 244/13 |
| 2,863,620 | 12/1958 | Vautier | 244/55 |
| 2,977,077 | 3/1961 | Pearson | 244/118.1 |
| 3,405,893 | 10/1968 | Flamand et al. | 244/119 |
| 3,516,625 | 6/1970 | Houser et al. | 244/50 |
| 3,670,995 | 6/1972 | Swearingen | 244/80 |
| 3,823,899 | 7/1974 | Currey | 244/103 W |
| 3,910,531 | 10/1975 | Leomand | 244/123 |
| 3,926,389 | 12/1975 | Mederer | 244/76 R |
| 4,093,156 | 6/1978 | Coe, Jr. | 244/45 A |
| 4,146,200 | 3/1979 | Borzachillo | 244/215 |
| 4,390,150 | 6/1983 | Whitener | 244/45 R |
| 4,395,450 | 7/1983 | Whitener | 244/123 |
| 4,674,712 | 6/1987 | Whitener | 244/119 |

FOREIGN PATENT DOCUMENTS 913005 12/1962 United Kingdom .
1126819 9/1968 United Kingdom .

OTHER PUBLICATIONS

Article, Aviation Week & Space Technology, vol. 113, No. 11, dated 9/15/80, pp. 80, 81, 84, 85, published by McGraw-Hill, Inc., U.S.A.
Article, Aviation Week & Space Technology, vol. 116, No. 22, dated 5/31/82, p. 4, published by McGraw-Hill, Inc., U.S.A.
Free Flight News, Olokko 35, F1B by O. Kilpelainen, published Jun. 1986 in Franborough, England.

Primary Examiner—Joseph F. Peters, Jr.
Assistant Examiner—Anne E. Bidwell
Attorney, Agent, or Firm—Hughes & Multer

[57] ABSTRACT

Airplanes which feature composite construction and have: a further aft than conventional center of gravity; a clean wing with a high aspect ratio; and all primary flight controls. These include trailing edge control segments (or elements) which extend the full span of the airplane wing. A central processor so schedules the upward and downward deployment of the control elements that: (1) downward and upward displacements of the control elements are respectively accompanied by pitch-up and pitch-down moments; (2) the inboard control elements are used primarily to change the coefficient of lift whereas roll control is effected principally by displacement of the outboard control elements; and (3) each of the control elements is individually displaced by a system which eliminates hydraulic systems and control cables. Hallmarks of these novel airplanes include simplicity, relatively low cost, lower weight, and safety.

24 Claims, 7 Drawing Sheets

FIG. 13

AIRCRAFT

This is a continuation of copending application Ser. No. 07/345,085 filed on Apr. 28, 1989, now abandoned, which is a continuation of copending application Ser. No. 06/948,317 filed on Dec. 31, 1986 which is also abandoned.

TECHNICAL FIELD OF THE INVENTION

The present invention relates to novel, improved aircraft which are aerodynamically efficient and relatively simple in terms of operation, structure, systems, and mechanisms and are consequently quieter and more economical to design, build, operate, and maintain than currently existing aircraft and those now coming into existence. Included in manufacturing and operating costs, in the this respect, are such indirect factors as the skill required to fly the aircraft and the ability of the aircraft to accommodate and/or survive adverse weather conditions as well as wind shear, gusts, and other phenomena which are inimical to the operation of an aircraft and the safety and comfort of the aircraft's passengers and/or crew.

In another aspect, the present invention relates to a flight control methodology which takes full advantage of state-of-the-art computer technology and thereby makes possible aircraft with the desirable attributes identified in the preceding paragraph.

BACKGROUND OF THE INVENTION

Even the most modern aircraft currently being built are surprisingly inefficient and complicated, making them expensive to design, build, operate, and maintain. Also, even state-of-the-art aircraft are relatively noisy, despite the significant advances that have been made in this area.

One reason that even advanced aircraft have these disadvantages is that they do not take full advantage of the opportunities for simplification and efficiency afforded by state-of-the-art computer technology. Instead of employing a flight control methodology which would take full advantage of present day computer technology, even the most advanced, existing aircraft only employ computers primarily to implement existing and established flight control methodology.

Another drawback of existing flight control methodology is that the center of gravity of a conventional aircraft is located relatively far forward. As a consequence, downwardly acting loads are imposed on the tails of the aircraft. This increases the load which must be supported by the aircraft wing, producing a corresponding decrease in the payload which the aircraft can lift.

Another disadvantage of aircraft with such forwardly located centers of gravity is that the aircraft tends to pitch down when the trailing edge control elements or flaps are lowered to increase the coefficient of lift of the aircraft. This is undesirable because pitch-down decreases lift, thus opposing the lift added by the flaps when they are lowered to increase the lift coefficient. Conversely, the pitch-up resulting when the control segments are deployed upwardly to decrease the lift coefficient also opposes this adjustment by increasing lift.

A related disadvantage is that the trailing edge control members of conventional aircraft are so designed and operated that large loads are imposed on the wing at significant distances from the aircraft body. These loads can cause unwanted wing bending; they can also make rapid pull-ups unsafe.

Existing aircraft also have the disadvantage of a relatively high trim drag coefficient. This is attributable in part to the relatively far forward center of gravity of a conventional airplane. Also, conventional aircraft have a variety of wing-and-tail-mounted control members such as ailerons, flaps, and spoilers with ends which are uncovered when they are deployed. The vortices generated at these ends of the control surfaces at any appreciable speed also contribute significantly to drag.

Also, so that take-off rotation can be achieved with an acceptable utilization of power, relatively low nose gear loadings must be utilized in conventional airplane designs. This may make it difficult to steer the airplane, especially in crosswinds and under other adverse conditions.

I suggested above that complexity is a disadvantage of planned and existing aircraft. This is attributable in significant part to the numerous hydraulic systems and control cables which operate the various flaps, spoilers, ailerons, etc. of a conventional aircraft. Furthermore, aircraft hydraulic systems are notoriously trouble prone and difficult to maintain.

Still other drawbacks of existing aircraft and those now coming into existence are attributable to their configuration and to the materials of which they are constructed.

A plot of the cross-sectional areas of a conventionally designed aircraft is an irregular curve with several sharp peaks. In practical terms, this means that the performance of the aircraft and its handling characteristics will suffer as the aircraft approaches the speed of sound, primarily because of the generation of shock waves.

Even advanced passenger and cargo planes are constructed primarily of aluminum alloys and other conventional structural materials. Consequently, those aircraft do not take advantage of the weight savings that could be realized by optimum utilization of modern structural composites with their high strength-to-weight ratios.

Another disadvantage of conventionally designed aircraft is that they must typically be flown in an extreme nose-up position in order to generate the lift needed to avoid stalling when the airplane is slowed for landing. This is undesirable because the pilot's view is restricted in this nose-up altitude, creating a safety hazard. Or, conversely, if conventional flaps are fully deployed to increase the lift coefficient, the safety margin is again undesirably reduced because only a small change in the angle of attack (or attitude) can cause the aircraft to stall.

Conventional aircraft are also susceptible to gusts and wind shear, and these phenomena have been blamed for a number of fatal crashes. At best, pilot skill and workload requirements may be well beyond what might be considered safe in those and other adverse conditions such as steering the aircraft in cross winds, on slick and other non-optimum surfaces, and in dive recovery, for example.

SUMMARY OF THE INVENTION

I have now invented, and disclosed herein, certain new and novel aircraft which, by virtue of their novel flight control methodology, do not have the foregoing drawbacks and disadvantages of current aircraft and those now coming into existence My novel flight control methodology is characterized primarily by the following features:

1. the flight controls are active;
2. all flight control surfaces are primary;
3. the trailing edge of the aircraft wing is divided into a number of control surfaces (also referred to as control segments, elements, or members), and those control surfaces can be deflected or pivoted both downwardly and upwardly with respect to the aircraft wing;
4. the center of gravity of the aircraft is located well aft by conventional standards;
5. the aerodynamic control segments are operated in accord with a schedule in which the deflection of the several segments on each side of the aircraft body is individually controlled and effected; and
6. the aerodynamic control segments are operated via redundant, self-reprogramming computers.

Airplanes embodying the foregoing flight control methodology have a number of interrelated advantages.

One is that, with the wing's center of lift well ahead of the center of gravity as it is in airplanes embodying the principles of the present invention, deployment of the trailing edge control segments as flaps to increase and decrease the lift coefficient of the aircraft respectively produces pitch-up and pitch-down moments rather than the opposite moments as is the case in conventionally designed aircraft This is important because lift is increased as the aircraft pitches up, the change in attitude of the aircraft thereby complementing the lift-increasing action of the control segments rather than opposing that action as is the case in a conventional airplane Conversely, the pitching down of the aircraft when the trailing edge control segments are deflected upwardly to decrease lift complements rather than opposes that action of the control segments. Thus, the trailing edge control members can be made to function with high efficiency in the same manner as conventional spoilers, eliminating the need for spoilers and complexity and problems appurtenant to the spoilers of conventional aircraft.

One other important advantage of the novel trailing edge system of segmented control members just described is that separate actions by the pilot are not required to change the attitude of the aircraft and to raise and lower the aircraft's flaps as is necessary in conventional aircraft Here, too, my novel flight control methodology makes major contributions toward safety and cost reductions by reducing the level of skill needed by the pilot and the pilot workload.

Trailing edge control segments which have a split construction and which extend beneath the aircraft body when lowered are preferably employed in the novel aircraft disclosed herein. One advantage of such control segments is that they enhance dive recovery because they provide additional drag plus lift; and the lift can be provided without making a necessarily slower attitude change.

Furthermore, this fully active system of trailing edge control members eliminates the need for stabilizer trim as is required in existing aircraft This reduces pilot workload and the skill needed to fly the airplane and leads to simplification because the nonactive sections of the empennage need not be movable with respect to the airplane body During cruise, all vertical vectors of loads on the tail of an airplane embodying the principles of my invention are directed upwardly. This contributes significantly to the efficiency of the aircraft because the wing does not have to generate lift to offset downwardly acting loads on the aircraft tail as it does in a more conventionally designed airplane.

The coefficient of lift can be controlled primarily by management of the trailing edge control segments rather than with alterations of aircraft attitude as it is in conventional aircraft This, particularly if a preferred variable gain of the control segments is employed, makes the aircraft disclosed herein much less sensitive to gusts and wind shear than a conventional airplane Also, the loads and bending moments imposed on the wing can be concentrated near the aircraft body where they can be more readily accommodated This makes it possible to realize a significant cost savings as a simpler and lighter wing can be employed.

Stall recovery of the novel airplanes disclosed herein is significantly superior. The raising or upward deflection of the trailing edge control surfaces reduces the lift coefficient and thereby instantly eliminates separated flow so that the airplane is no longer stalled. Rapid stall recovery is further promoted by the flight control methodology disclosed herein because the reduction in lift produced by raising the control segments pitches the aircraft downwardly, further reducing the lift coefficient and contributing to the recovery of flying speed.

During landing approaches, direct control over lift can be achieved by deployment of the trailing edge control segments. This eliminates the need for altering the attitude of the airplane to the heretofore necessary nose-high up configuration. This is a significant advantage from the viewpoint of safety as the flight path can be more accurately controlled because of the pilot's better view.

As indicated above, the full span, fully active system of primary trailing edge control segments may make it possible to eliminate the spoilers and/or leading edge devices necessarily employed in existing high speed aircraft for air braking and for roll control.

Another advantage of aircraft employing the flight control methodology disclosed herein is that, if attention is paid to the details of the aircraft configuration, "trimming" of the airplane can be eliminated as a conscious control function.

It will also be apparent to the reader that only small excursions of attitude need be made in flying airplanes employing the novel control methodology disclosed herein This is important from several viewpoints including safety and passenger comfort. Even these small excursions are made primarily to provide the pilot with appropriate and adequate clues about the airplane's response to his piloting rather than to control the lift coefficient by changing the aircraft's attitude as is conventionally done.

Also, with the center of gravity well aft as it is in aircraft embodying the principles of my invention; with pitch control implemented primarily with the trailing edge control segments; and with the lift coefficient relatively independent of the attitude of the airplane, take-off rotation is reduced and readily achieved. This allows higher nose gear loadings to be employed, providing better steering control, particularly under adverse conditions.

The center of gravity is shifted aft in the aircraft disclosed herein by: (1) employing a wing which has a much higher aspect ratio than the wing of a conventionally designed aircraft; and (2) by locating the cargo and passenger compartments, engines, and main landing gear toward the rear of the aircraft.

A wide, preferably double lobe body will typically be employed. This configuration lends itself to sought after, eight abreast seating and to mixed loads of passengers and cargo. The width afforded by the double lobe configuration also separates the aft mounted engines by an amount which is significantly greater than is the case in a conventional airplane design. This shifts the aerodynamic center of the airplane to the extent that the engines pay their own way aerodynamically; i.e., aerodynamically, the engines support their own weight.

The width of the double lobe configuration also affords the freedom needed in locating the landing gear so that the aircraft center of gravity will be in the optimum location.

Another advantage of the relatively far aft location of the main landing gear is that it thereby becomes relatively simple to make those landing gear steerable. Steerable main landing gear facilitate cross-wind landings and makes the airplane easier to handle on the ground.

This preferred location of the landing gear also allows relatively short landing gear struts to be employed. This is important as it simplifies the landing gear, making another significant cost reduction possible.

As will be apparent to the reader from the foregoing, aircraft employing the flight control methodology disclosed herein can be significantly simpler than their present day counterparts. Because of reduced drag, for example, they are also quieter than existing aircraft and those coming into existence.

Furthermore, those aircraft take full advantage of state-of-the-art, composite structural materials. This makes a major contribution to efficiency and cost reduction.

Also, the separate center section of conventional aircraft wing designs can be eliminated in the novel composite wing design disclosed herein. This promotes simplicity, reduces weight, and eliminates potential structural weak points.

In addition, the composite wing construction disclosed herein has no joints and no fasteners in areas of maximum stress. Higher stresses are therefore allowable.

A multi-spar construction which has low fail-safe penalties is used; and internal ribs are eliminated, producing a significant cost saving as does the low part card count of this construction.

In addition, wing inspection can be accomplished without providing the access doors required for inspection purposes in conventional designs.

The reader will also be aware that the flight control methodology described above takes full advantage of state-of-the-art computer technology to make the aircraft in which that methodology is employed simpler and safer to fly.

In the novel aircraft disclosed herein, the numerous hydraulic systems (or hydraulic systems and control cables) employed in conventional aircraft to operate flaps, spoilers, ailerons, and other control members are preferably replaced with computer-controlled, state of-the-art electric motors. This makes a major contribution to the simplicity and lower cost of such aircraft.

Furthermore, an airplane embodying my novel design principles has an envelope of cross-sectional areas which is relatively smooth and characterized by a minimum of sharp peaks. As a consequence, the performance and handling characteristics of the airplane are superior to those of a more conventional one at speeds approaching the speed of sound.

OBJECTS OF THE INVENTION

From the foregoing, it will be apparent to the reader that one important and primary object of the present invention resides in the provision of novel, improved airplanes which are aerodynamically efficient and relatively simple in terms of operation, structure, systems, and mechanisms and are consequently quieter and more economical to design, build, operate, and maintain than currently existing aircraft and those now coming into existence.

Another important and primary object of my invention is the provision of aircraft which require less skill to fly, impose a lower workload on the pilot, and are otherwise safer to fly than conventional ones in that: (1) the added lift required as speeds are slowed during landing approaches can be obtained without rotating the airplane into an attitude which restricts the pilot's visibility, and (2) the flight methodology employed makes them less susceptible to gusts and wind shear and speeds stall and dive recovery.

And yet another important and primary object of the present invention is the provision of a novel, improved flight control methodology which takes full advantage of state-of-the-art computer technology and thereby makes possible aircraft with the desirable attributes identified in the preceding objects.

Still other important but more specific objects of my invention reside in the provision of airplanes in accord with the preceding objects:

in which all flight controls are active;

in which all flight control surfaces or elements are primary;

in which a series of control segments at the trailing edge of, and spanning, the aircraft wing replaces the complicated system of flaps, spoilers, and ailerons and other primary and secondary control surfaces of modern aircraft;

in which, in conjunction with the preceding object, the several control segments are computer-operated in accord with schedules which both control the coefficient of lift and the roll of the aircraft;

which have a wing with a higher aspect ratio than is employed in existing passenger and cargo aircraft and those coming into existence;

in which the center of gravity is significantly further aft than it is in a more conventional airplane;

in which, in conjunction with the preceding object, the center of gravity is sufficiently far aft that lowering the trailing edge control surfaces will induce pitch-up moments while the raising of those control surfaces will cause pitch-down moments so that the change in attitude of the airplane will complement and enhance the lift coefficient changing action of the control surfaces;

in which the vertical vectors of the loads imposed on the tail of the aircraft during cruise are all directed upwardly;

in which the coefficient of lift can be controlled primarily by management of trailing edge control surfaces rather than by changes in the attitude of the aircraft;

in which, in conjunction with the preceding object, the lift coefficient is substantially independent of the attitude of the aircraft;

in which trimming of the aircraft can be eliminated as a conscious control function;

which exhibit superior operating and handling characteristics as supersonic speeds are approached;

in which steering control is superior, particularly under adverse conditions;

which have a body configuration that lends itself to preferred seating arrangements, to mixed loads of passengers and cargo, to landing gear placements that allow the center of gravity of the aircraft to be optimally located, and to engine placements in which the engines carry their own weight.

Other important objects and features and additional advantages of my invention will be apparent to the reader from the foregoing and the appended claims and as the ensuing detailed description and discussion of the invention proceeds in conjunction with the accompanying drawing.

DETAILED DESCRIPTION OF THE DRAWING

Figure 1:
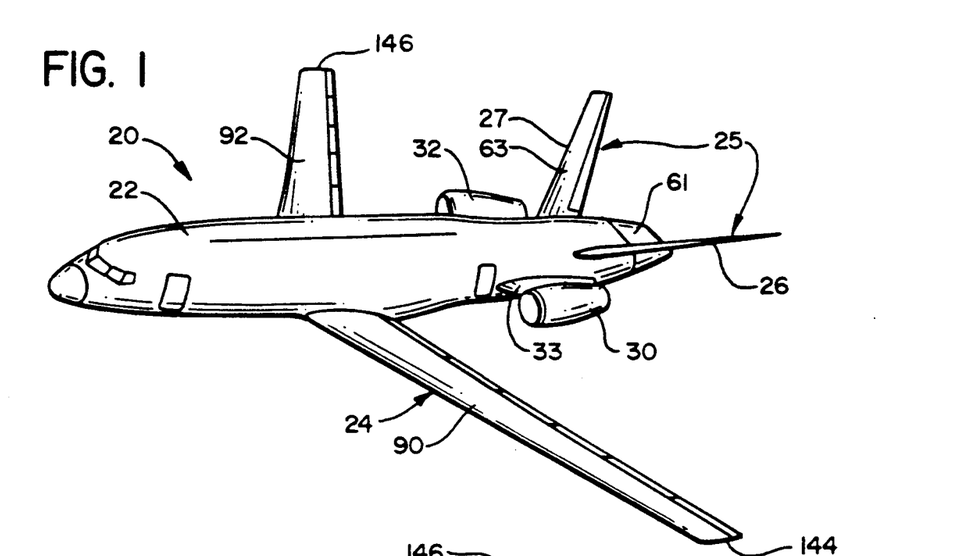
FIG. 1 is a pictorial view of a high efficiency aircraft constructed in accord with, and embodying, the principles of the present invention.
Figure 2:
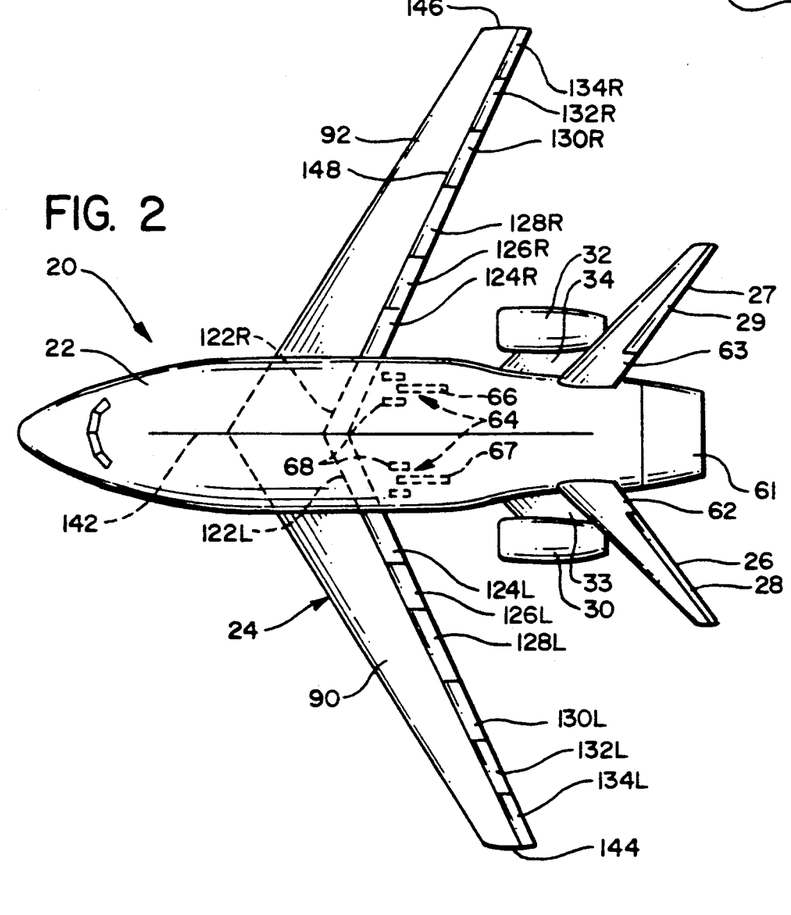
FIG. 2 is a plan view of the aircraft of FIG. 1.
Figure 3:
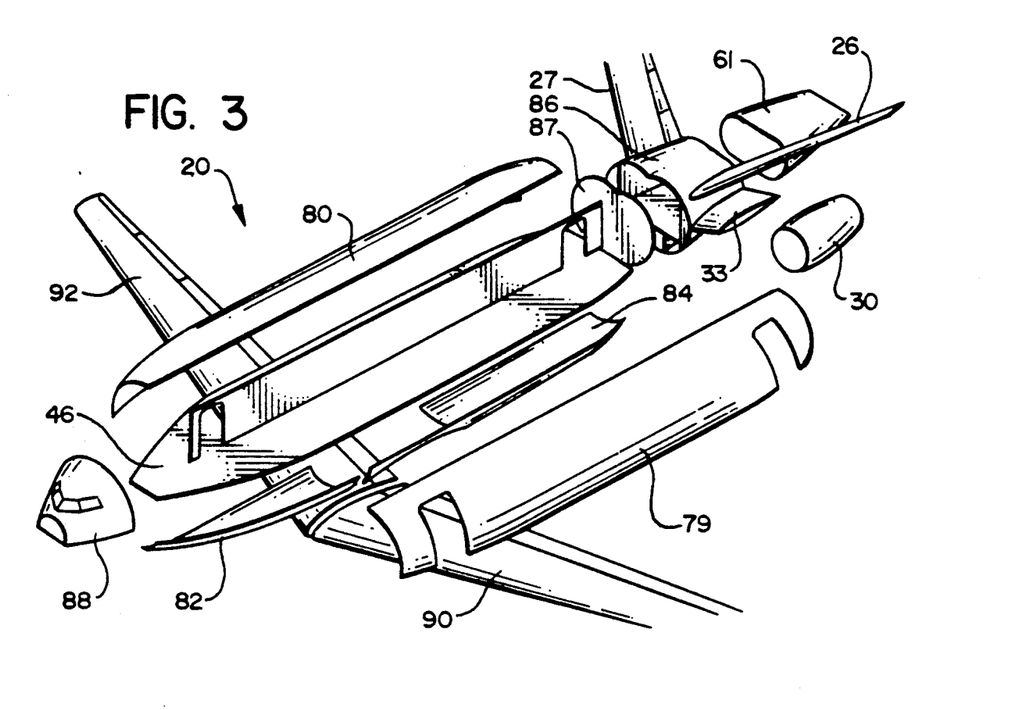
FIG. 3 is an exploded view showing the major sections of the aircraft of FIG. 1.

Referring now to the drawing, FIGS. 1-3 depict an airplane 20 constructed in accord with, and embodying, the principles of the present invention.

The major components of aircraft 20 include a body 22 of double lobe configuration (see FIG. 4); swept back wing 24 of high aspect ratio located at the bottom of aircraft body 22; a V-type empennage 25 including two members 26 and 27 with active control surfaces 28 and 29; and two propulsion units 30 and 32 supported from opposite sides of aircraft body 22 immediately ahead of empennage 25 by aerodynamic struts 33 and 34.

Figure 9:
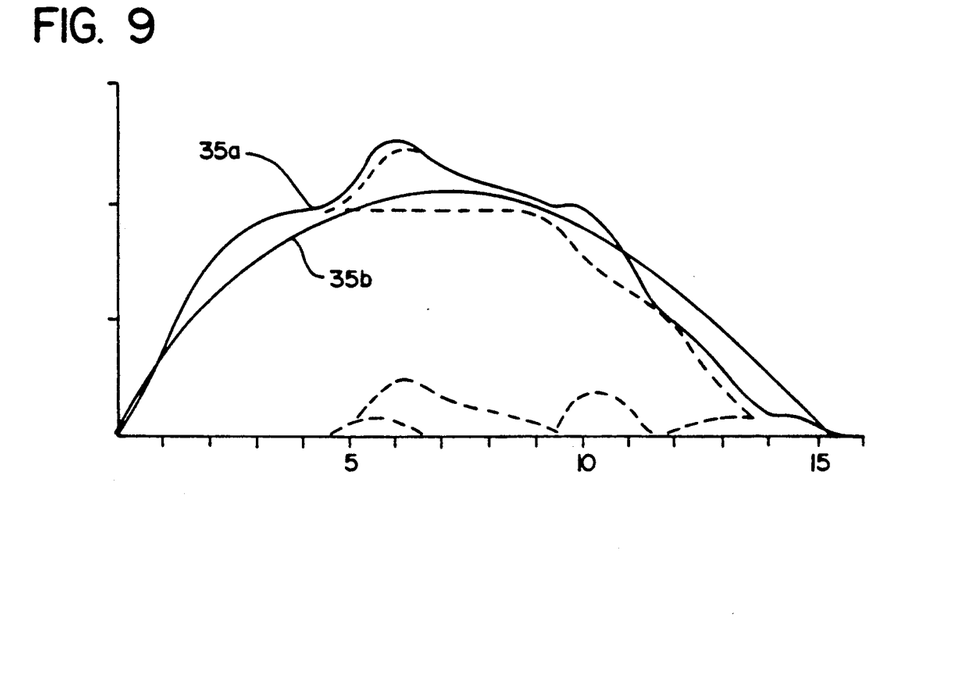
FIG. 9 is a graph showing an envelope of cross-sectional areas for the aircraft of FIG. 1.

I pointed out above that one important advantage of an aircraft such as that just discussed and identified by reference character 20 is its improved performance and handling characteristics as it nears supersonic speed and that these advantages are obtained by configuring the aircraft so that a curve representing an envelope of cross-sections taken at intervals along its length will be a smooth curve with no sharp peaks. This ideal is closely approached by airplane 20 as is apparent from FIG. 9 which contains a curve 35a representing the envelope of cross-sectional areas for airplane 20 and an idealized curve 35b. As desired, curve 35a has no sharp peaks and is relatively smooth.

Figure 4:
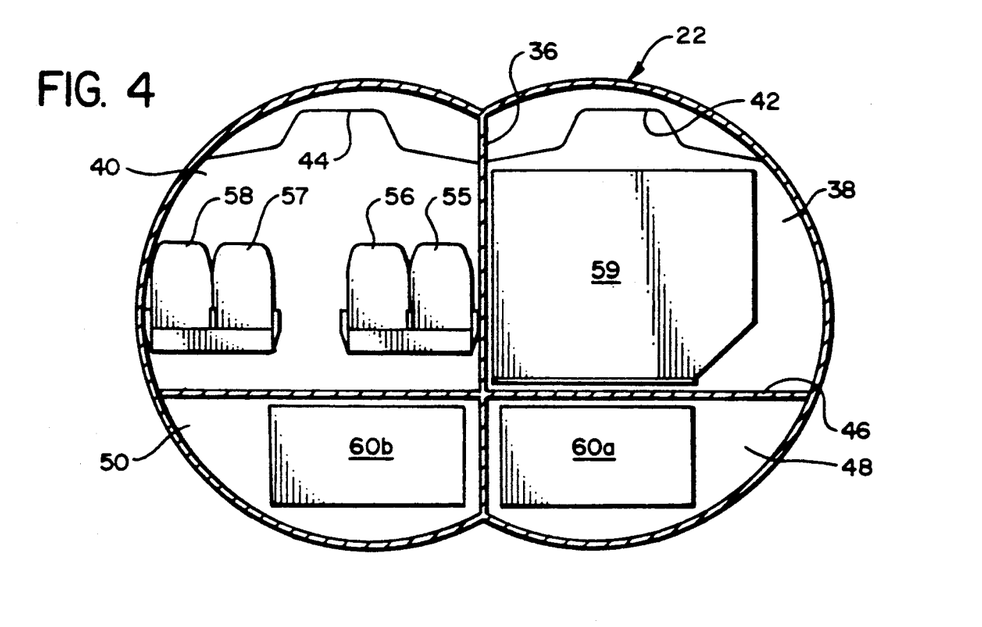
FIG. 4 is a section through the body of the aircraft of FIG. 1 showing a mixed configuration in which the aircraft is capable of carrying both passengers and a large amount of cargo.

Two significant contributing factors to curve 35a are: (1) the aft mounted engines, which remove the engine appurtenant area from that part of the curve where the area peaks; and (2) the high aspect ratio wing I employ. This wing contributes significantly less to the peak than a conventional one would because it is so narrow and because of its swept back configuration. As is best shown in FIG. 4, the double lobe body 22 of aircraft 20 is divided by a vertical partition 36 into two compartments 38 and 40 for passengers or cargo or for a mixture of passengers and cargo. Each of these compartments has a ceiling 42 or 44, and there is a floor 46 with two additional cargo compartments 48 and 50 located therebeneath.

The double lobe body configuration shown in FIG. 4 is preferred because it lends itself to the highly desirable eight abreast seating arrangement. Four of the seats (identified by reference characters 55 . . . 58 in FIG. 4) can be located in each of the compartments 38 and 40. Typically, in cargo and mixed passenger and cargo configurations, the cargo will first be loaded into containers designed to fit into upper compartments 38 and-/or 40 and lower compartments 48 and 50. Exemplary containers are shown in FIG. 4 and identified by reference characters 59, 60a, and 60b.

In the illustrated aircraft 20, the passengers and cargo (especially the latter) are located in the aft part of the aircraft body insofar as this is possible in order to keep the center of gravity of the loaded aircraft well rearward of the location it would assume in a conventional design. To facilitate access to the cargo, the rearmost section 61 of the aircraft body is preferably constructed so that it can be swung aside.

The two propulsion units 30 and 32 of aircraft 20 will typically be fan jets of a state-of-the-art design. Neither the details of these engines nor the struts supporting them from aircraft body 22 are part of the present invention. Consequently, those components of aircraft 20 will not be described further herein.

Empennage 25 is likewise of a construction which does not need to be described in detail herein because that construction is not part of my present invention. It is believed sufficient to note that the control surfaces 28 and 29 of the empennage function as in other V-shaped tails to control both up-and-down movement of aircraft 20 and its heading.

It is also noteworthy that, in contrast to more conventional aircraft designs, the members 26 and 27 of empennage 25 need not be trimmed. Consequently, the inactive sections 62 and 63 of the empennage need not be made movable with respect to aircraft body 22 as is necessary in a more conventional aircraft design. They can instead be attached in fixed fashion to the aircraft body. This is important from the viewpoints of simplification and cost reduction.

Also shown in FIG. 2 is the main landing gear 64 of aircraft 20. The nose gear may be of conventional construction and in a conventional location; and it has accordingly not been shown in the drawing.

The main landing gear 64 is located behind wing 24, again in the interest of keeping the center of gravity of airplane 20 well aft.

It consists of two trucks 66 and 67, each having two wheels 68. The main landing gear retracts upwardly into the body 22 of aircraft 20. The body has a width capable of accommodating the main landing gear because of its preferred, double lobe configuration.

This arrangement has the advantage that the main landing gear can readily be made steerable. Also, the posts (not shown) by which trucks 66 and 67 are supported are relatively short This means that they can be made simpler and lighter because they need not withstand the larger bending moments and stresses imposed upon the longer struts of conventional airplanes.

Contributing to the rearwardly displaced center of gravity of aircraft 20 is the high aspect ratio of the aircraft wing 24. An aspect ratio of 10-14 is preferred.

Another benefit of this high aspect ratio wing is that it leaves a space in which the main landing gear can be located independently of the wing structure In the flight control methodology disclosed herein, the center of gravity is related to the mean aerodynamic chord (MAC) of the airplane's wing. As is customary, the leading edge of the mean aerodynamic chord is zero percent MAC and the trailing edge of the chord is 100 percent MAC.

The center of gravity is located at a fore and-aft location which is between 44 percent MAC and 70 percent MAC. This places the center of lift of wing 24 well ahead of its center of gravity.

I pointed out above a number of advantages that are obtained by employing the just described, further aft than conventional location of the center of gravity of airplane 20. One is that generally upwardly directed loads are imposed upon the members 26 and 28 of significantly increases the payload which airplane 20 can lift.

Also, this novel relocation of the airplane's center of gravity results in: (1) the aircraft tending to pitch up when the active control components at the trailing edge of wing 24 are lowered to increase the coefficient of lift of the aircraft; and (2) the aircraft pitching down to decrease lift when those control elements are raised to decrease the lift coefficient. Thus, the pitching moments imposed upon airplane 20 either increase or decrease lift in a manner which complements the action of the control elements rather than opposing that action as is the case in existing airplanes and those now coming into existence.

I pointed out above that low drag is a significant attribute of airplanes employing the novel flight control methodology disclosed herein. This is evident from FIG. 10 in which curve 77 shows that the drag coefficient $C_D$ is zero or less for a center of gravity in the above-discussed, and preferred, 44 percent to 70 percent mean aerodynamic chord range. In contrast, with the center of gravity located in the conventional 10 percent to 35 percent MAC range, the drag coefficient ranges from +0.0002 up to approximately 0.001 (off the chart of FIG. 10). Even at the lower edge of this range, the drag on a conventionally designed airplane is significant.

Figure 10:
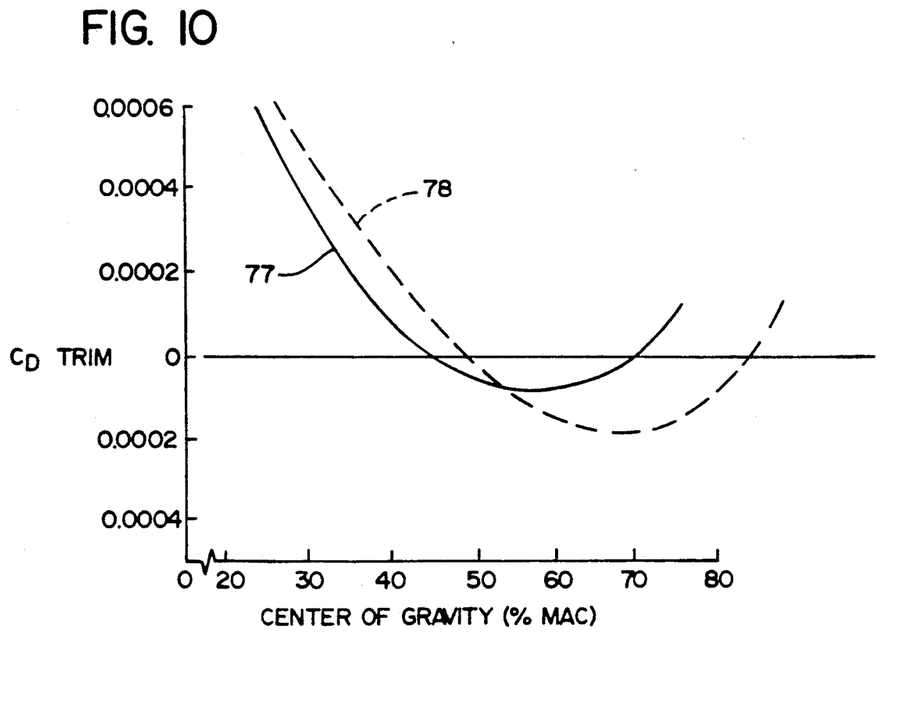
FIG. 10 is a graph showing the effect of tail surface area on the center of gravity of an aircraft designed in accord with the flight control methodology addressed herein.

A comparison of curve 77 with the second curve 78 in FIG. 10 also shows that the design of the empennage is important in the novel flight control methodology disclosed herein in that changes in the size of the tail members effects a definite shift in the center of gravity of the airplane being designed.

This relocation of the aircraft's center of gravity to the rear results also in take-off rotation being reduced and more readily achieved; and this allows higher nose gear loadings to be employed, providing better steering control, particularly under adverse conditions.

As is best shown in FIG. 3, airplane 20 can be assembled from a relatively small number of independently fabricated sections. In particular, the aircraft body 24 is made up of two upper, left and right sections 79 and 80; corresponding lower sections (the left-hand two of which are shown in FIG. 3 and identified by reference characters 82 and 84); a section 86 which is located behind those just identified and supports empennage 25 and propulsion units 30 and 32; the swing-away tail section 61; partition 36; floor 46; a rear bulkhead 87; and, at the opposite end of the aircraft, a cockpit section 88.

Wing 24 is made up of left and right sections 90 and 92. However, as was indicated above, this wing may alternately be fabricated as a unitary or one-piece member.

At least the wing 24 of airplane 20 is of a novel, composite structure which has the advantages discussed above including the elimination of internal ribs, the elimination of joints and fasteners in highly stressed areas, and a significant reduction in weight.

Figure 5:
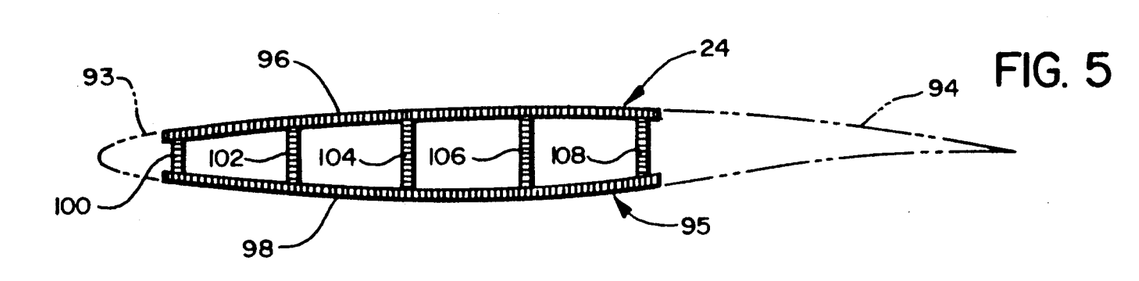
FIG. 5 is a section taken through the aircraft wing to show its composite construction.
Figure 6:
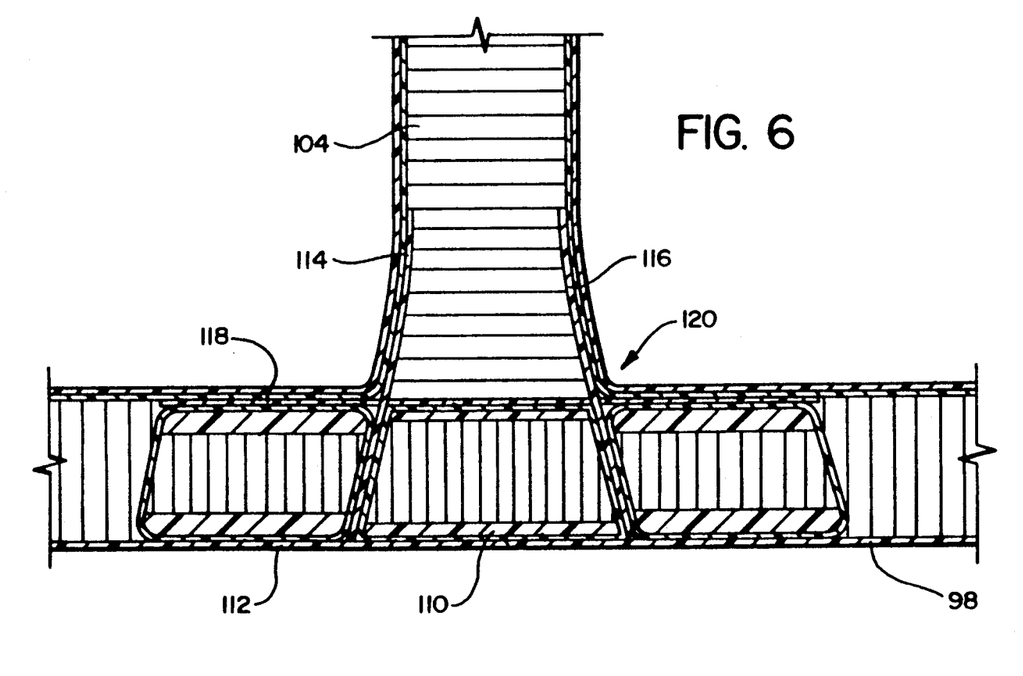
FIG. 6 is a fragment of FIG. 7 drawn to an enlarged scale to show details of the composite wing construction.

This novel wing, shown in detail in FIGS. 5 and 6, has a nose section 93; a full span series of juxtaposed, primary, active control members or segments identified collectively by reference character 94 in FIG. 5; and a main section 95.

The main section 95 of wing 24 includes: (1) upper and lower panels 96 and 98 separated by spaced apart, longitudinally extending spars 100 ... 108; (2) longitudinally extending stiffeners 110 at the panel/spar intersections to carry the bending moments imposed upon wing 24; and (3) an outer skin 112. This skin is typically composed of a layer of carbon reinforcing filaments wound in helical fashion around the main section 95 of wing 24 and longitudinally extending tapes laid in side-by-side relationship on the wound filament reinforcing.

The upper and lower panels 96 and 98, the spars 100 ... 108, and the stiffeners 110 are all of honeycomb construction. Like the upper and lower panels, the stiffeners are preferably wound with carbon filaments to increase their strength Also, as is best shown in FIG. 6, fabric tapes 114, 116, and 118 are employed to increase the strength of the joint 120 between each panel 96 or 98 and spar 100 ... 108

Referring again to FIG. 2, there are a series of active, primary control surfaces or elements 122 ... 134 at the trailing edge of each of aircraft 20's left and right wing sections 90 and 92. These control elements extend in side-by-side relationship from the center 142 of wing 24 to the left wing tip 144 and to the right wing tip 146. Each control element 122L ... 134L and 122R ... 134R is independently hinged for upward and downward pivotable movement about an axis extending longitudinally of the wing section 90 or 92 in which that segment is incorporated. An exemplary hinge axis, that for control element 128R, is located at the forward edge of the control element and is identified by reference character 148.

The trailing edge control components serve two functions. They are utilized both to change the coefficient of lift of airplane 20 and to control the roll of the airplane.

The upward and downward movement or deflection of each trailing edge control component 122L ... 134L and 122R ... 134R is independently effected by a separate electric motor through a mechanical linkage which has not been depicted and will not be described herein because its details are not part of my present invention. These motors are shown diagrammatically in FIG. 8 and identified by reference characters 150-1 ... 150-n.

Any desired type of electric motor may be employed. However, those employing samarium/cobalt permanent magnets are preferred because of their high torque-to-weight ratio, the elimination of brushes and commutators, and the ability to operate as a stalled motor while holding the control element in a fixed position.

The control elements 122L ... 134L and 122R ... 134R can be of any desired construction although a construction analogous to a split flap is preferred. As discussed above, this construction is preferred because of the enhanced dive recovery it provides as the control elements are deployed downwardly beneath the aircraft body.

Figure 7:
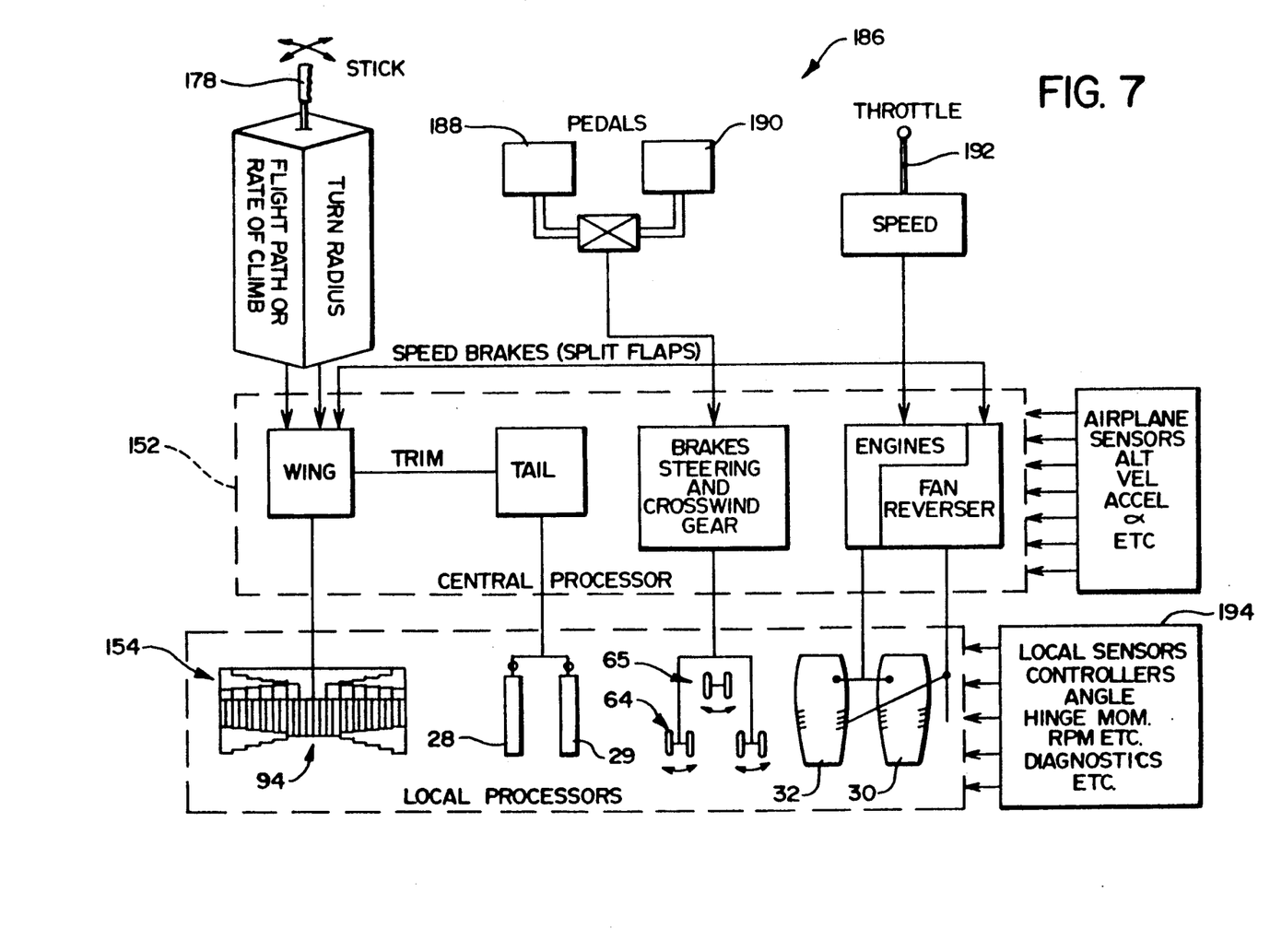
FIG. 7 is a schematic diagram of a control system for the aircraft of FIG. 1.
Figure 8:
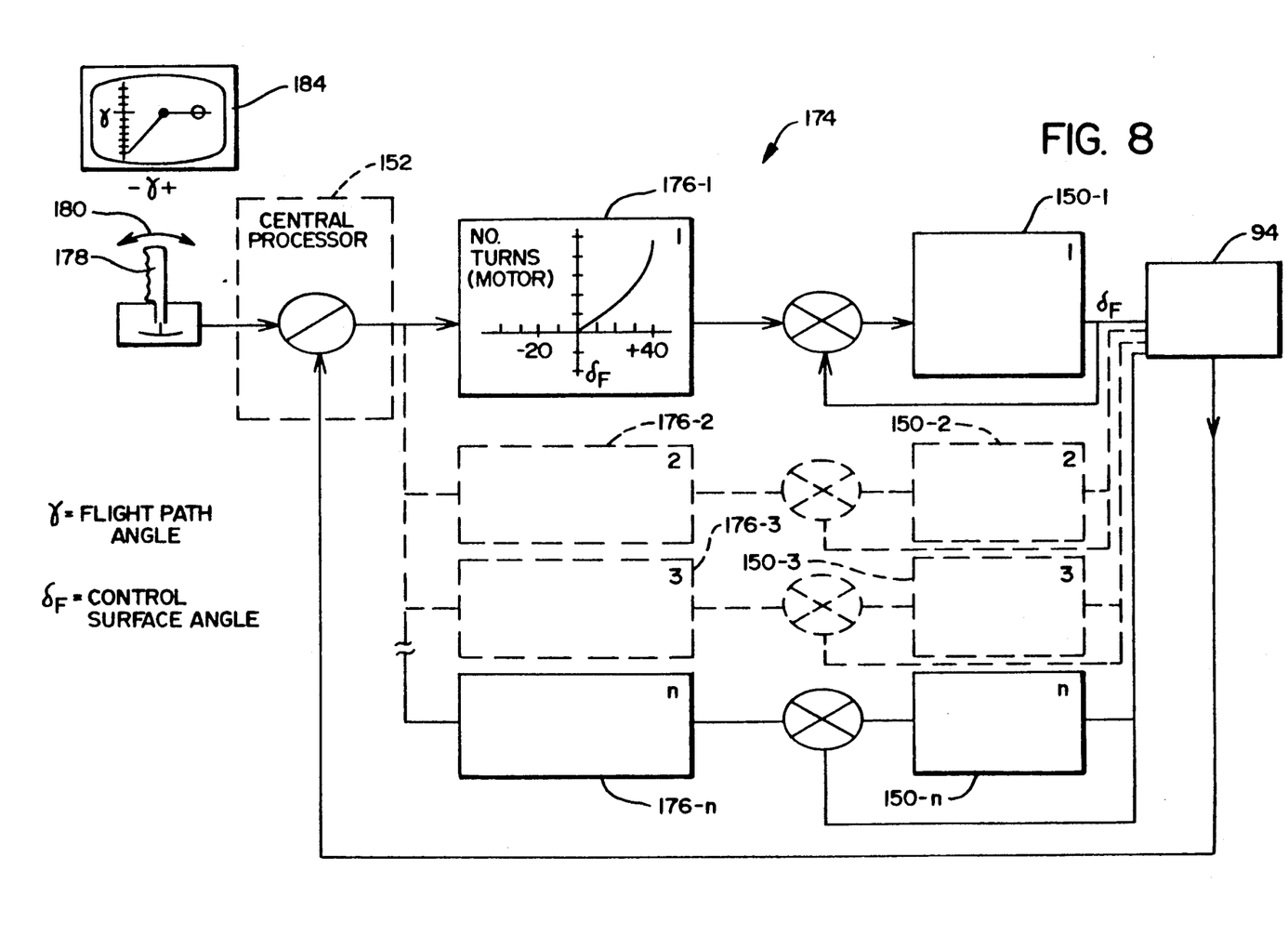
FIG. 8 is a schematic of a subsystem employed in the control system of FIG. 7 to operate certain trailing edge control members incorporated in the aircraft wing.
Figure 11:
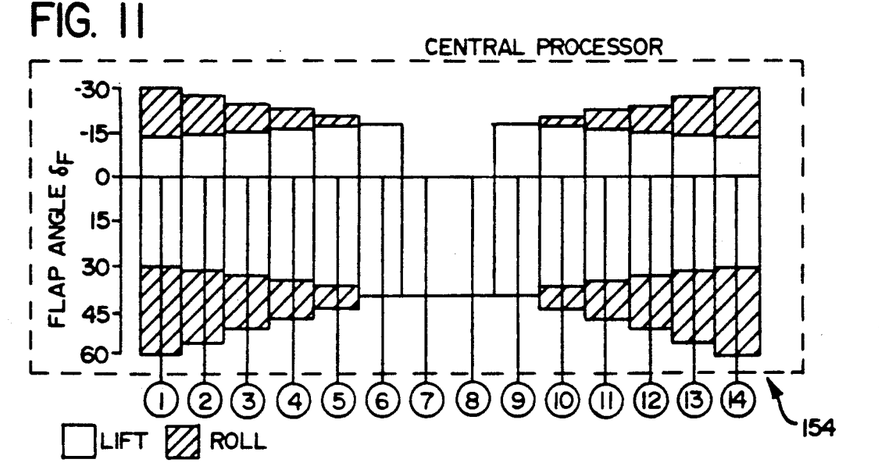
FIG. 11 is an exemplary control schedule for the trailing edge control surfaces.
Figure 12:
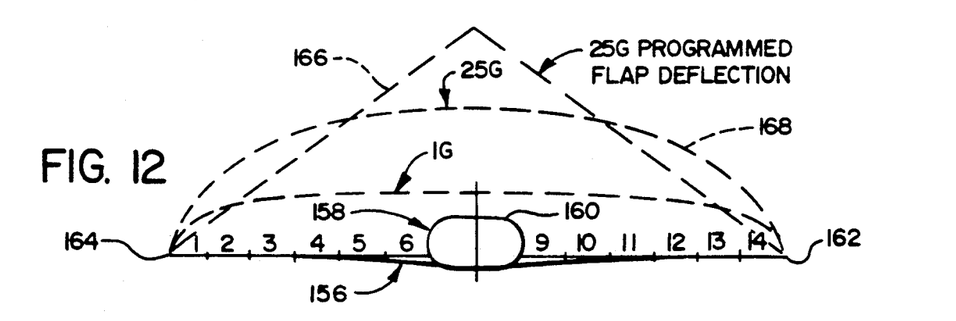
FIG. 12 is a graph showing the desirable decrease in outboard wing loading which can be obtained by scheduling the deployment of the trailing edge control members in accord with the flight control methodology disclosed herein.

The upward and downward movement of the trailing edge control elements is controlled by a central processor 152 (see FIGS. 7 and 8). A representative schedule for a full span, fully active trailing edge control element system as shown in FIG. 2 but with a smaller number of active, primary control elements 1-14 is depicted in FIG. 11 and identified by reference character 154. Trailing edge control elements 1-14 are incorporated in the wing 156 of an aircraft 158 of the character shown in detail in FIGS. 1-3 and illustrated diagrammatically in FIG. 12.

In the exemplary schedule 154 shown in FIG. 11, the two, furthest inboard, trailing edge control elements 7 and 8 and the adjacent elements 6 and 9 are employed solely to control the coefficient of lift of airplane 158. The coefficient of lift is increased to produce additional lift as these control elements are lowered and reduced to decrease lift in a manner akin to a spoiler as control elements 6 and 9 are raised (control elements 7 and 8 can of course not be raised as they are located directly beneath the body 160 of airplane 158).

The more outwardly located control elements 1-5 and 10-14 can also be lowered and raised to respectively increase and decrease the coefficient of lift of aircraft 158. However, as is apparent from FIG. 11, the movement of these control elements is so scheduled that, proceeding from the body 160 of aircraft 158 toward its wing tips 162 and 164, each control element can be deployed only to a somewhat smaller (typically two degree) maximum.

The term "gain" is employed herein to identify this staggered upward and downward deployment of the trailing edge control elements in airplanes embodying the principles of the present invention. Typically, this gain may range from 1.0 at the innermost control elements to 0.25 at those control elements located at the tips of the aircraft wings.

This gain has two salutary effects. First, a more-than-adequate part of the excursion of each of the trailing edge control elements 1-5 and 10-14 is reserved for roll control.

Second, this variable gain scheduling of the deployment of trailing edge control elements 1-14 concentrates the loadings on wing 156 nearer the body 158 of airplane 160 than is the case in a more conventional design. This is apparent from a comparison of curves 166 and 168 in FIG. 12.

Near the airplane body, the loads and bending moments imposed on the wing can be more readily accommodated than they can at more outboard locations where more complex, and heavier, structures are required to accommodate the large loads and bending moments existent in conventional designs even at locations very near the tips of the aircraft wing. Thus, the novel flight control methodology disclosed herein offers both a much simplified wing construction and a significant cost reduction.

A number of important advantages obtained by employing the full span array of trailing edge control segments just described was discussed above. One of these is that a large increase in lift coefficient can be obtained with only a minor adjustment in the attitude of the aircraft. This is important from the viewpoint of increased visibility and in avoiding nose-up attitudes at which the aircraft might inadvertently stall.

Figure 13:
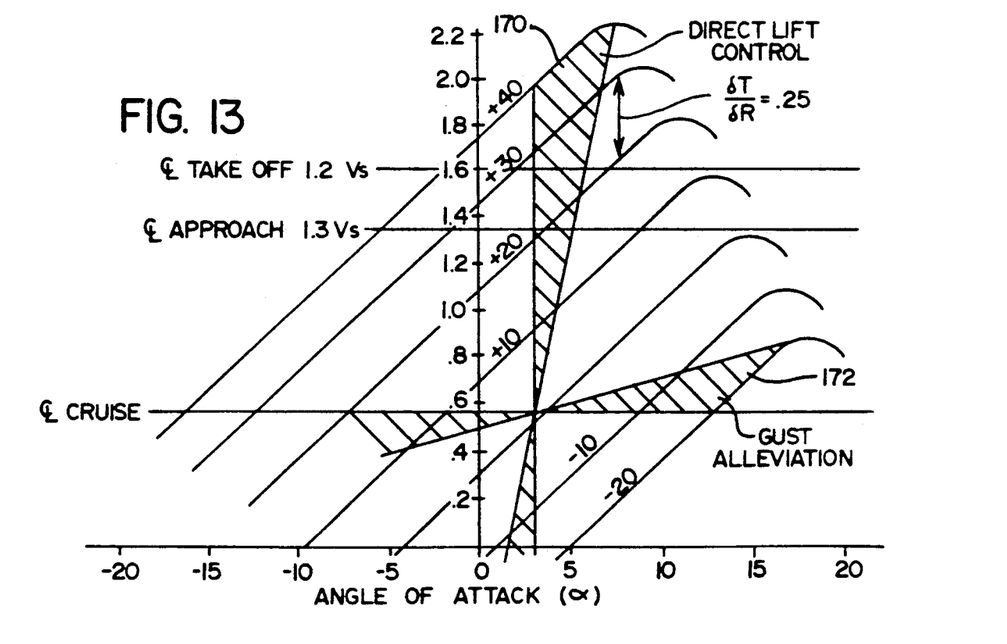
FIG. 13 is a graph showing the improved flight characteristics and resistance to the effects of wind gusts that can be had by employing the flight control methodology disclosed herein.

The active, primary control elements of the subject aircraft operate to provide that relationship between lift coefficient and airplane attitude shown in the shaded area 170 in FIG. 13. This Figure makes it clear that the lift needed for both approaches and takeoffs can be readily obtained with only minor changes in the attitude of the aircraft and that the angle of attack is, in both takeoff and landing configurations, only a few degrees.

Also, the second shaded area 172 in FIG. 13 makes it clear that the changes of airplane attitude resulting from gusts can be quickly counteracted in the airplanes disclosed herein merely by raising the trailing edge control elements to decrease the lift coefficient of the airplane. Because these elements are operated directly by electric motors rather than through complicated control cable and/or hydraulic systems, this can be accomplished in a fraction of the time that would be required to effect a similar maneuver in a conventional airplane by manipulating its secondary flight controls.

Referring now to FIG. 8, the system including motors 150-1 ... 150-n and central processor 152 and employed for scheduling the operation of trailing edge control elements 122L ... 134L and 122R ... 134R (FIG. 2) or 1-14 (FIG. 11) is illustrated in FIG. 8 and identified by reference character 174. In addition to the components just enumerated, this system includes a controller 176-1 ... 176-n for each of the control element operating motors 150-1 ... 150-n.

The flight path wanted by the airplane pilot is selected by pushing forward or pulling back on a conventional stick 178 as indicated by double-headed arrow 180 in FIG. 8. This information is inputted to central processor 152 which calculates the number of revolutions of each motor 150-1 ... 150-n required to set the control elements operated by those motors at angles which will cause the airplane 20 (or 158) to assume the flight path selected by the pilot. This information is outputted to controllers 176-1 ... 176-n which thereupon cause the controlled motors 150-1 ... 150-n to make the appropriate number of revolutions in one direction to raise the control element operated by that motor and in the opposite direction to lower it.

Positional information is fed back from the trailing edge control elements to both the motors 150-1 .. 150-n and to central processor 152. These feedbacks are employed to make any minor adjustments in the positions of the trailing edge control elements that may be required to cause the aircraft to assume the pilot-selected flight path.

The flight path followed by the aircraft is displayed on a screen 184.

The just-described control system 174 is incorporated in a larger system 186 illustrated in FIG. 7 and employed to also control: (1) the active, primary control elements 28 and 29 of tail members 26 and 28; (2) the steering of main landing gear 64 and forward landing gear 65; and (3) the operation of engines 30 and 32. The inputs are from stick 178, left and right pedals 188 and 190, and throttle 192.

The inputs from stick 178 (forward and back and left and right) are employed by central processor 152 to schedule the operation of the primary, active wing and tail control elements as discussed above. As in more conventional aircraft, pedals 188 and 190 are utilized to operate the aircraft brakes (not shown) and to steer its main and forward landing gears 64 and 65. Again, control is exercised via central processor 152.

Throttle 192 also operates in a somewhat conventional manner to control (through central processor 152) the speed of the airplane and the fan reversers typically incorporated in such engines to slow the aircraft after it lands. As shown in FIG. 7, the input from throttle 192 will also typically be employed by central processor 152 to raise the trailing edge control elements after the airplane has landed. This kills all lift and insures that the airplane remains on the ground.

The central processor 152 of control system 186 will also typically receive such inputs as the altitude, velocity, acceleration, etc. of the airplane in which it is incorporated. Local processors associated with the primary control surfaces, landing gear, and engines will receive additional inputs such as those identified in block 194 of FIG. 7 The particular inputs which are provided and the manner in which they are employed are not part of m present invention; and these aspects of control system 186 will accordingly not be described herein.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What I claim as my invention:

1. A high efficiency airplane which comprises: a body, a swept wing having a root mounted to said body and extending laterally from said body, said wing having an aspect ratio of 10 or greater, the center of gravity of said airplane being on a line which passes through a point lying aft of said wing root and between 44 percent and 70 percent of the mean area chord of said swept airplane wing, main landing gear located in said body aft of said center of gravity, said airplane wing being free from having main landing gear located thereunder, and a tail at the rear of said body.

2. A high efficiency airplane as defined in claim 1 which includes two propulsion units mounted on said body of said airplane behind said airplane wing and ahead of said tail, and wherein one of said propulsion units is located on each side of said airplane body.

3. A high efficiency airplane as defined in claim 1 wherein a rearmost section of said airplane body is displaceable to afford access to a cargo bay in said body.

4. A high efficiency airplane which comprises: a body, a single, swept main wing having a root attached to said body, said wing extending laterally from said body and having an aspect ratio on the range of 10-14, displaceable control members at the trailing edge of said wing, and a tail at the rear of said body, the center of gravity of said airplane being on a line which passes through a point lying between 44 percent and 70 percent of the mean area chord of said swept airplane wing, said center of gravity of said airplane being sufficiently far aft of said trailing edge of said wing which is adjacent said wing root that: (a) operation of said control members which are located inboard and adjacent said body which increases the coefficient of lift of said airplane wing results in pitch-up of said airplane, and (b) operation of said control members which are located inboard and adjacent said body which reduces that coefficient of lift results in pitch-down of said airplane.

5. A high efficiency airplane as defined in claim 4 wherein said control members are of continuous segmented construction.

6. A high efficiency airplane which comprises: a body, a wing extending laterally from said body, a tail at the rear of said body, and primary, active control members which are located at the trailing edge of said wing and are pivoted for movement relative to said wing at their forward edges and about an axis extending longitudinally of said wing, there being a series of such control members extending the full span of said wing from said airplane body to the tip of said wing on each side of said airplane body, said airplane further comprising means for so scheduling the deployment of said control members that, when said members are deployed to increase or decrease the coefficient of lift of said wing, each succeeding control member nearer said body of the airplane is deployed to a greater extent than the preceding control member, and means for controlling the movement of said trailing edge members as aforesaid, said movement controlling means comprising a separate electric motor for displacing each of said control members, a central processor for calculating the number of turns required for each of said motors to displace said control member operated thereby in accord with a schedule generated by said central processor in response to a pilot controlled input to said central processor, and a separate controller for causing each of said motors to rotate for said number of turns calculated by said central processor.

7. A high efficiency airplane as defined in claim 6 wherein said means for deploying said control members is capable of deflecting said members both upwardly and downwardly with respect to said airplane wing.

8. A high efficiency airplane as defined in claim 6 which has means for effecting a further, scheduled deflection of control members which have not theretofore been deployed to their maximum extent in increasing of decreasing said coefficient of lift in order to control the roll of said airplane.

9. A high efficiency airplane as defined in claim 6 wherein the gain of said control members in the configuration thereof providing a maximum coefficient of lift varies in continuous fashion from one at the members nearest said airplane body to a small value at said tips of said wing and in a manner so selected as to optimize the load distribution over the span of said wing.

10. A high efficiency airplane as defined in claim 6 which has feedback means operatively connected between each of said trailing edge control members and said central processor.

11. A high efficiency airplane as defined in claim 6 which has feedback means operatively connected between each of said trailing edge control members and the motor by which said control member is displaced.

12. A high efficiency airplane as defined in claim 6 in which said trailing edge control members are the only control surfaces attached to or otherwise incorporated in the airplane wing.

13. A high efficiency airplane as defined in claim 6 in which said wing and said tail are so related that all vertical loads acting on said tail while said airplane is cruising are upwardly directed loads.

14. A high efficiency airplane as defined in any of the preceding claims 1, 4 or 6 in which said airplane body is of a double lobe configuration providing two side-by-side compartments for cargo and/or passengers.

15. A high efficiency airplane as defined in any of the preceding claims 1, 4 or 6 in which the envelope of the cross-sectional areas of said airplane is relatively smooth and free of sharp peaks.

16. An airplane as defined in any of the preceding claims 1, 4, or 6 in which said wing is a unitary, one-piece wing of composite construction.

17. An airplane as defined in claim 16 wherein the composite of which said wing is formed includes wound, graphite filament reinforcements.

18. A high efficiency airplane as defined in any of the preceding claims 1, 4, or 6 in which said airplane wing is located beneath and is fixed to the bottom of the airplane body.

19. A method of scheduling the upward and downward movement of the control members of an airplane which has a body and a swept wing attached to said body and having an aspect ratio of 10 or more and a series of juxtaposed, hinged, control members at the trailing edge of said wing, the center of gravity of said airplane being on a line which passes through a point lying between 44 percent and 70 percent of the mean area chord of said swept wing, so that said control members at said trailing edge of said wing which are inboard and adjacent said body are forward of said center of gravity, in which method said control members are independently displaced and in which the displacement of said control members is so scheduled that: (a) said inboard control members play the principal role in increasing the positive and negative lift coefficients of said airplane, and (b) said control members which are outboard of said inboard control members play the principal role in controlling the roll of said airplane.

20. A high efficiency airplane which comprises:

a body having a double lobe configuration;

a tail mounted at the rear of said airplane body;

a single, high aspect ratio, main wing having a root mounted to the bottom of said aircraft body, said wing being swept back from said root and having a plurality of control members at the trailing edge of said wing, the center of gravity of said airplane being aft of said wing root on a line which passes through a point lying between 44 percent and 70 percent of the mean area chord of said main wing so that, while said airplane is cruising, all vertical loads acting on said wing and said tail are upwardly directed loads, and the control members at said trailing edge of said wing which are located inboard and adjacent said body being sufficiently far forward of said center of gravity so that operation of said inboard control members which increases the coefficient of lift of said wing results in pitch-up of said airplane and operation of said inboard control members which decreases the coefficient of lift of said wing results in pitch-down of said airplane;

nose landing gear mounted in said aircraft body forward of said center of gravity; and main landing gear mounted in said double-lobe aircraft body independently of said wing and aft of said center of gravity of said airplane so that downwardly directed loads are maintained on said nose landing gear while said airplane is on the ground.

21. A high efficiency airplane as defined in claim 20 wherein said wing is free from having landing gear located thereunder and said main landing gear comprises a first landing gear set mounted in a first said lobe of said body and a second landing gear set mounted in a second said lobe of said body.

22. A high efficiency airplane as defined in claim 21 wherein each said landing gear set of said main landing gear is sufficiently short to be stowed within a said lobe of said body which has said landing gear set mounted therein.

23. A high efficiency airplane as defined in claim 20 wherein said wing has an aspect ratio in the range of 10-14.

24. A high efficiency airplane as defined in claim 20 which includes:

first and second propulsion units mounted on said body aft of said center of gravity, said first propulsion unit being so mounted to a first side of said body by an aerodynamic strut and said second propulsion unit being so mounted to a second side of said body by an aerodynamic strut that said propulsion units are separated by said double-lobe body and said aerodynamic struts to an extent which is sufficient to shift the aerodynamic center of said airplane aft of said center of gravity toward said propulsion units.

* * * * *